United States Patent [19]
Wooldridge et al.

[11] Patent Number: 5,804,772
[45] Date of Patent: Sep. 8, 1998

[54] APPARATUS AND METHOD FOR DISPENSING BATCHES OF ARTICLES

[75] Inventors: Donald R. Wooldridge, Dunkirk; John L. Ditman, Buckeystown, both of Md.

[73] Assignee: Batching Systems, Inc., Owings, Md.

[21] Appl. No.: 726,218

[22] Filed: Oct. 4, 1996

Related U.S. Application Data

[60] Provisional application No. 60/004,760, Oct. 4, 1995.

[51] Int. Cl.⁶ .......................... G01G 13/02; B65G 27/02
[52] U.S. Cl. .................... 177/116; 177/119; 177/105; 198/757
[58] Field of Search .................... 198/367, 442, 198/757; 177/25.18, 105, 116, 25.17, 108, 119

[56] References Cited

U.S. PATENT DOCUMENTS

| | | | |
|---|---|---|---|
| 2,101,561 | 12/1937 | Gilbert | 249/2 |
| 2,443,350 | 6/1948 | Gilbert et al. | 249/43 |
| 2,632,588 | 3/1953 | Hoar, Jr. | 226/2 |
| 2,661,881 | 12/1953 | Kasper | 226/2 |
| 2,679,312 | 5/1954 | Dean | 198/33 |
| 2,696,292 | 12/1954 | Spurlin | 198/757 |
| 2,718,957 | 9/1955 | Spurlin | 198/757 |
| 2,818,968 | 1/1958 | Carrier, Jr. | 198/220 |
| 3,187,884 | 6/1965 | Carrier, Jr. | 198/220 |
| 3,280,964 | 10/1966 | Burgess, Jr. | 198/757 |
| 3,347,324 | 10/1967 | Stewart | 177/1 |
| 3,394,804 | 7/1968 | Reichel | 209/73 |
| 3,429,423 | 2/1969 | Pirrrello et al. | 198/757 |
| 3,530,974 | 9/1970 | Moore | 198/757 |
| 3,552,511 | 1/1971 | Marcheso et al. | 177/1 |
| 4,000,807 | 1/1977 | Molique | 198/757 |
| 4,157,738 | 6/1979 | Nishiguchi et al. | 177/1 |
| 4,258,765 | 3/1981 | Suomi | 144/193 A |
| 4,266,691 | 5/1981 | Wolowicz | 222/77 |
| 4,306,540 | 12/1981 | Hutchison | 126/424 |
| 4,382,527 | 5/1983 | Lerner | 222/56 |
| 4,393,950 | 7/1983 | Klopfenstein et al. | 177/108 |
| 4,512,428 | 4/1985 | Bullilvant | 177/25 |
| 4,522,321 | 6/1985 | Kinoshita | 177/25.18 |
| 4,600,065 | 7/1986 | Morris | 177/123 |
| 4,629,017 | 12/1986 | Shroyer | 177/25.18 |
| 4,645,020 | 2/1987 | Haze | 177/25 |
| 4,739,846 | 4/1988 | Minamida et al. | 177/1 |
| 4,874,049 | 10/1989 | Kee et al. | 177/59 |
| 4,901,807 | 2/1990 | Muskat et al. | 177/25.18 |
| 5,199,517 | 4/1993 | Kirby | 177/25.17 |
| 5,269,440 | 12/1993 | Bohnert et al. | 221/200 |
| 5,325,653 | 7/1994 | Boyd | 53/248 |
| 5,429,160 | 7/1995 | Bardroff et al. | 141/72 |

FOREIGN PATENT DOCUMENTS

| | | |
|---|---|---|
| 927199 | 10/1954 | Germany. |
| 72144 | of 0000 | Switzerland. |

*Primary Examiner*—M. L. Gellner
*Assistant Examiner*—Randy W. Gibson
*Attorney, Agent, or Firm*—Alfred J. Mangels

[57] ABSTRACT

Apparatus and a method for aggregating a desired number of articles without individually counting out each article to achieve the desired number. A stream of the articles is discharged into a weigh hopper until substantially a predetermined weight of articles is in the hopper. The number of articles in the hopper is determined from the total weight of the hopper and the weight of a single article. Additional articles are caused to enter the hopper one-by-one until the desired total number of articles is contained in the hopper. The contents of the hopper are then packaged for distribution.

18 Claims, 6 Drawing Sheets

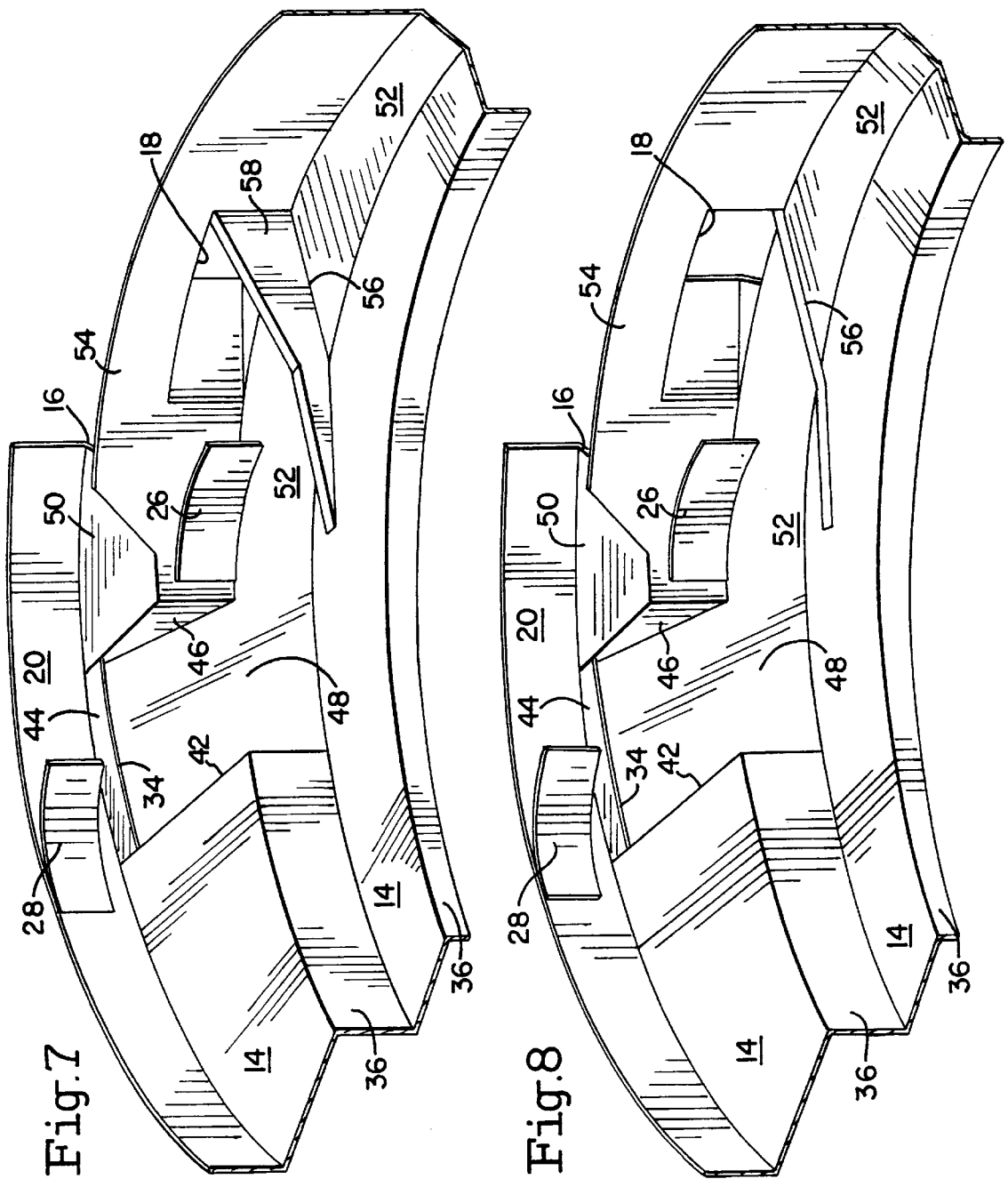

APPARATUS AND METHOD FOR DISPENSING BATCHES OF ARTICLES

CROSS-REFERENCE TO RELATED APPLICATION

This application is based upon copending Provisional application Ser. No. 60/004,760, filed on Oct. 4, 1995, and the right of priority provided in 35 U.S.C. § 119(e) is hereby claimed.

BACKGROUND OF THE INVENTION

1. Field of the Invention

The present invention relates to an apparatus and a method for accumulating and dispensing a predetermined number of articles for subsequent packaging. More particularly, the invention relates to a method and apparatus for accumulating small articles, such as screws, washers, and the like, to a predetermined weight of articles, or to a predetermined count as indicated by weight.

2. Description of the Related Art

The accumulation of small hardware articles, such as screws, washers, and the like, as well as other types of small articles, is usually by a predetermined number of the articles for subsequent packaging and sale. The articles are counted out and then packaged. The count is most often performed by some type of counting device wherein a stream of the articles is passed through a light beam, and the number of interruptions or changes in the amount of light, caused by at least partial blockage of the light beam, is sensed by a photocell. The number of interruptions or the number of changes in light intensity as sensed by the photocell are analyzed and when predetermined criteria are met a count is produced. When the desired number of articles has been counted, the accumulated articles are dropped into a flexible bag or a carton, which is then closed and shipped to retailers of such goods.

The individual counting of each one of a predetermined number of small articles requires a certain time period, which is based upon the number of articles desired to be accumulated into a batch for packaging, and also based upon the rate of passage of the articles through the sensing beam. As a result, for maximum accuracy of counting, the flow of articles should be in single file order, to provide one count per article. Faster rates of flow could result in more than one article simultaneously passing through the light beam at the same time, which would provide more than the predetermined number of articles. That result in undesirable for the packager as it amounts to unintended overpacking and thereby reduces his profit on sales of the articles. It is therefore desirable to provide a faster way of accumulating the articles to be packaged, one that does not require the counting of each individual article separately.

It is an object of the present invention to provide an improved and faster method for accumulating small articles for packaging.

It is a further object of the present invention to provide an improved accumulating and feeding apparatus for accumulating and feeding to a packaging station a group of articles in bulk form, and for then feeding articles individually in a sufficient number to add to the accumulated group to provide the desired predetermined number of articles.

SUMMARY OF THE INVENTION

Briefly stated, in accordance with one aspect of the present invention, apparatus is provided for receiving a plurality of individual articles and for feeding and dispensing the articles in predetermined batches. A feeder bowl is included for receiving a plurality of articles to be arranged in predetermined batches, the bowl including a spiral track along which articles within the bowl are caused to move by vibrating the bowl. The bowl includes a first outlet port and a second outlet port, wherein the first outlet port is adapted to pass articles individually and the second outlet port is adapted to pass articles in a stream containing a plurality of articles. An intermediate receiver is positioned to receive articles discharged form the first and second outlet ports, the intermediate receiver including a first discharge chute for receiving articles discharged from the first outlet port and a second discharge chute for receiving articles discharged from the second outlet port, wherein each of the first and second discharge chutes includes a respective chute outlet door operable to control the flow of articles from the respective discharge chutes. A weighing device is positioned to receive articles discharged from the first and second discharge chutes of the intermediate receiver, the weighing device including a container and a weighing means associated with the container for sensing the weight of the container and its contents.

In accordance with another aspect of the present invention a method is provided for accumulating a predetermined number of articles. The method includes loading a feeder bowl with a plurality of the articles, and discharging a group of the articles from the feeder bowl into a weigh hopper until a predetermined weight of articles is received in the weigh hopper. The number of articles in the weigh hopper is determined based upon the weight of the weigh hopper and its contents and the weight of an individual article. A sufficient number of individual articles are discharged from the feeder bowl into the weigh hopper until a desired total number of articles is determined to be within the weigh hopper, whereafter the articles are discharged from the weigh hopper into a container positioned to receive articles discharged from the weigh hopper.

BRIEF DESCRIPTION OF THE DRAWINGS

FIG. 7 is a fragmentary perspective view of the interior of the feeder bowl of FIG. 1 taken in a direction toward the discharge ports of the bowl and showing a movable gate in an extended position, to deflect and guide articles into one of the discharge ports.

FIG. 8 is a fragmentary perspective view similar to FIG. 7 of the interior of the feeder bowl of FIG. 1 and showing the bowl interior when the deflector gate is in a retracted position, to prevent the flow of articles into the one discharge port.

DESCRIPTION OF THE PREFERRED EMBODIMENTS

Figure 1:
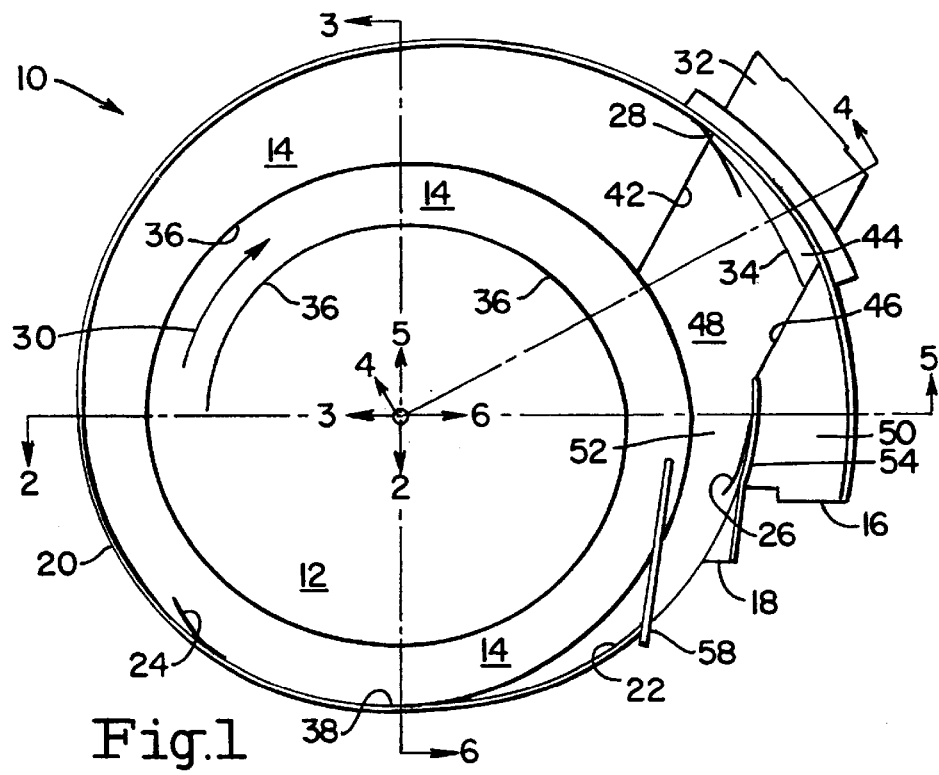
FIG. 1 is a top plan view of a feeder bowl in accordance with the present invention.

Referring now to the drawings, and particularly to FIG. 1 thereof, there is shown in plan view a generally circular feeder bowl 10 for receiving and feeding small articles in a desired manner for counting and for subsequent packaging of the counted parts. Feeder bowl 10 can be adapted to receive articles from an article supply hopper (not shown), and, if desired, a level sensing device (not shown) can be provided in association with bowl 10 to sense the level of articles in the bowl and to actuate a conveyor device to convey articles from the supply hopper, to actuate a discharge door on the supply hopper, or the like, to convey additional articles to bowl 10 when the level of articles within the bowl falls below a predetermined level. In that regard, the structure and operation of such supply and level maintaining arrangements is well known to those skilled in the art, and consequently further details of the structure and operation of such arrangements are not necessary.

Bowl 10 is a dual-flow, dual outlet article feeder bowl that includes a generally circular, recessed central base portion 12. A spiral track 14 extends at a point offset from the center of base portion 12 outwardly and upwardly to a first discharge port 16 and a second discharge port 18. An upstanding surrounding side wall 20 extends upwardly from the outer periphery of substantially the last 270° of arc of track 14, as well as from the remaining edge 22 of bowl 10, to prevent spillage of the articles from the bowl and to control flow from the bowl to take place only through either of first discharge port 16 or second discharge port 18.

A plurality of curved wipers 24, 26, and 28 are provided at spaced positions around the periphery of bowl 10 and extend inwardly to control the level and positioning of the articles to be counted. The distance by which the respective wipers extend inwardly can preferably be adjusted. Wiper 24 serves to level the stream of articles by deflecting higher articles so that a predetermined level of articles is maintained. Wiper 26 serves to regulate the width of the stream of articles that passes through discharge port 18. Wiper 28 serves to maintain a single level of the articles by deflecting all articles above the lowermost level of wiper 28 so that only a single file of articles passes toward discharge port 16. As will be appreciated by those skilled in the art, movement of the articles within bowl 10 is induced by vibrations introduced by a suitable vibrator (not shown), usually positioned below bowl 10, which causes the articles to travel along spiral track 14 in a clockwise direction as shown, in the direction of arrow 30, from the center of the bowl upwardly about 2 inches and outwardly toward the two discharge ports for about 1⅛ revolutions.

A movable slide 32 extends inwardly into bowl 10. Slide 32 includes a forward edge 34 that is positioned to maintain a stream of articles in single file order to pass toward discharge port 16 along the outermost end of track 14. Articles in excess of a single line of articles will fall inwardly toward the center of bowl 10, as will be further explained hereinafter.

Figure 2:
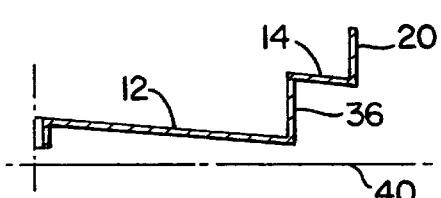
FIG. 2 is a cross-sectional view taken along the line 2—2 of FIG. 1.
Figure 3:
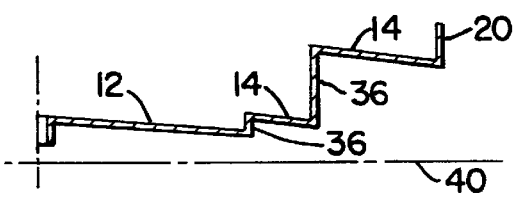
FIG. 3 is a cross-sectional view taken along the line 3—3 of FIG. 1.

The interior configuration of bowl 10 is illustrated in the several cross-sectional views shown in FIGS. 2 through 6. As shown, central base portion 12 slopes downwardly and outwardly from the center, to cause the articles in base portion 12 to slide outwardly and downwardly toward the lowermost point of spiral track 14 that defines an entry point for the articles onto the track. As shown in FIG. 3, the lower, beginning part of track 14 is separated from base portion 12 by a continuous wall 36 that describes a spiral, and that also separates inner and outer portions of track 14. Wall 36 ultimately merges into side wall 20 at intersection 38 (see FIG. 1). As is apparent from FIGS. 2 and 3, track 14 is progressively elevated relative to a horizontal reference plane 40.

Figure 4:
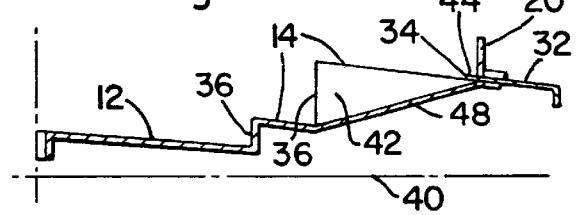
FIG. 4 is a cross-sectional view taken along the line 4—4 of FIG. 1.

As shown in FIG. 4, track 14 has become wider at its outermost and uppermost portion 14 adjacent slide 32, and a first step 42 (also see FIG. 7) is provided to define the downstream end of track 14. As seen in FIGS. 1 and 4, slide 32 extends inwardly to provide a narrow, article-receiving surface 44 that serves as a narrow extension of track 14 to enable a single file line of articles to continue to move along side wall 20 toward first discharge port 16. Downstream of first step 42 and spaced therefrom is a second step 46 that together with first step 42 defines the sides of a downwardly and inwardly inclined chute 48 (see also FIG. 7).

Figure 5:
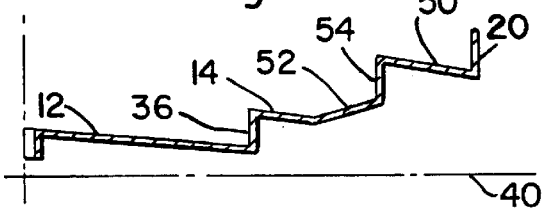
FIG. 5 is a cross-sectional view taken along the line 5—5 of FIG. 1.

The cross section illustrated in FIG. 5 is about 30° of arc clockwise from the cross section illustrated in FIG. 4 and shows a first exit track 50 that extends from second step 46, between surface 44 defined by slide 32, to first discharge port 16. Also shown in FIG. 5 is a second exit track 52 that merges with and extends from inclined chute 48 to second discharge port 18. First exit track 50 slopes downwardly and outwardly, whereas second exit track 52 slopes downwardly and inwardly, for reasons that will hereinafter be explained. A separation wall 54 defining a step (also see FIG. 7) extends vertically between the innermost edge of first exit track 50 and the outermost edge of second exit track 52.

Figure 6:
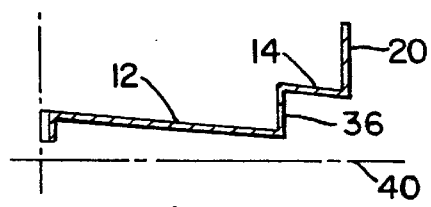
FIG. 6 is a cross-sectional view taken along the line 6—6 of FIG. 1.

FIG. 6 shows the relationship of track 14 to central base portion 12 at a point 90° upstream of FIG. 2 and is similar to FIG. 2 except that in FIG. 6 track 14 is at a lower elevation relative to reference plane 40 than it is in FIG. 2.

FIGS. 7 and 8 show the structure of bowl 10 adjacent first discharge port 16 and second discharge port 18. A narrow, elongated slot 56 is provided through the surfaces of second exit track 52 and of spiral track 14. Slot 56 extends from second discharge port 18 and lies substantially on a tangent to a circle having its center coincident with the center of central base portion 12 to terminate at a point within track 14. A vertically slidable gate 58 is received within slot 56 and is movable between an extended, discharge position as shown in FIG. 7 and a retracted position as shown in FIG. 8.

Figure 9:
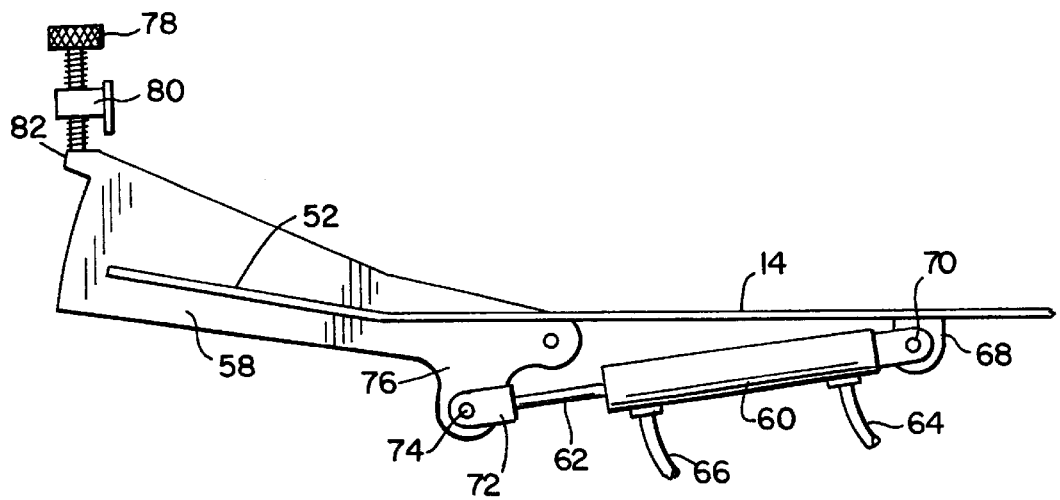
FIG. 9 is an enlarged, fragmentary view through the feeder bowl showing the actuation arrangement for the defector gate, with the deflector gate in the extended, article-deflecting position.
Figure 10:
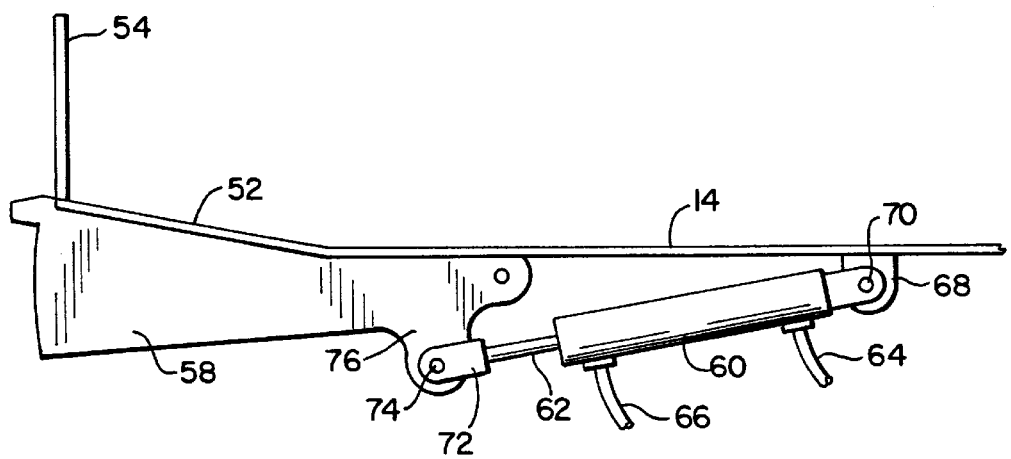
FIG. 10 is an enlarged, fragmentary view similar to FIG. 9, showing the actuation arrangement for the deflector gate with the deflector gate in the retracted, non-article-deflecting position.

Actuation of slidable gate 58 can be effected by a pneumatic cylinder 60 as illustrated in FIGS. 9 and 10. FIG. 9 shows gate 58 in the extended, discharge position by causing the extension of piston rod 62 from cylinder 60 by introducing pressurized air into conduit 64 and allowing conduit 66 to communicate with the atmosphere. Cylinder 60 is pivotally supported from a boss 68 on the underside of bowl 10 that carries a pivot 70. Similarly, piston rod 62 terminates with a tab 72 that is pivotally connected by a pivot 74 with an ear 76 that extends downwardly from gate 58. A stop screw 78 is threadedly carried in a sleeve 80 that is secured to bowl 10 to define a stop 82 at its outermost end surface to limit the upward movement of gate 58. Lowering or retraction of gate 58 to the position shown in FIG. 10 is effected by reversing the pressurization and exhaust connections to conduits 66 and 68 by suitable valving (not shown) of a type known to those skilled in the art.

Figure 11:
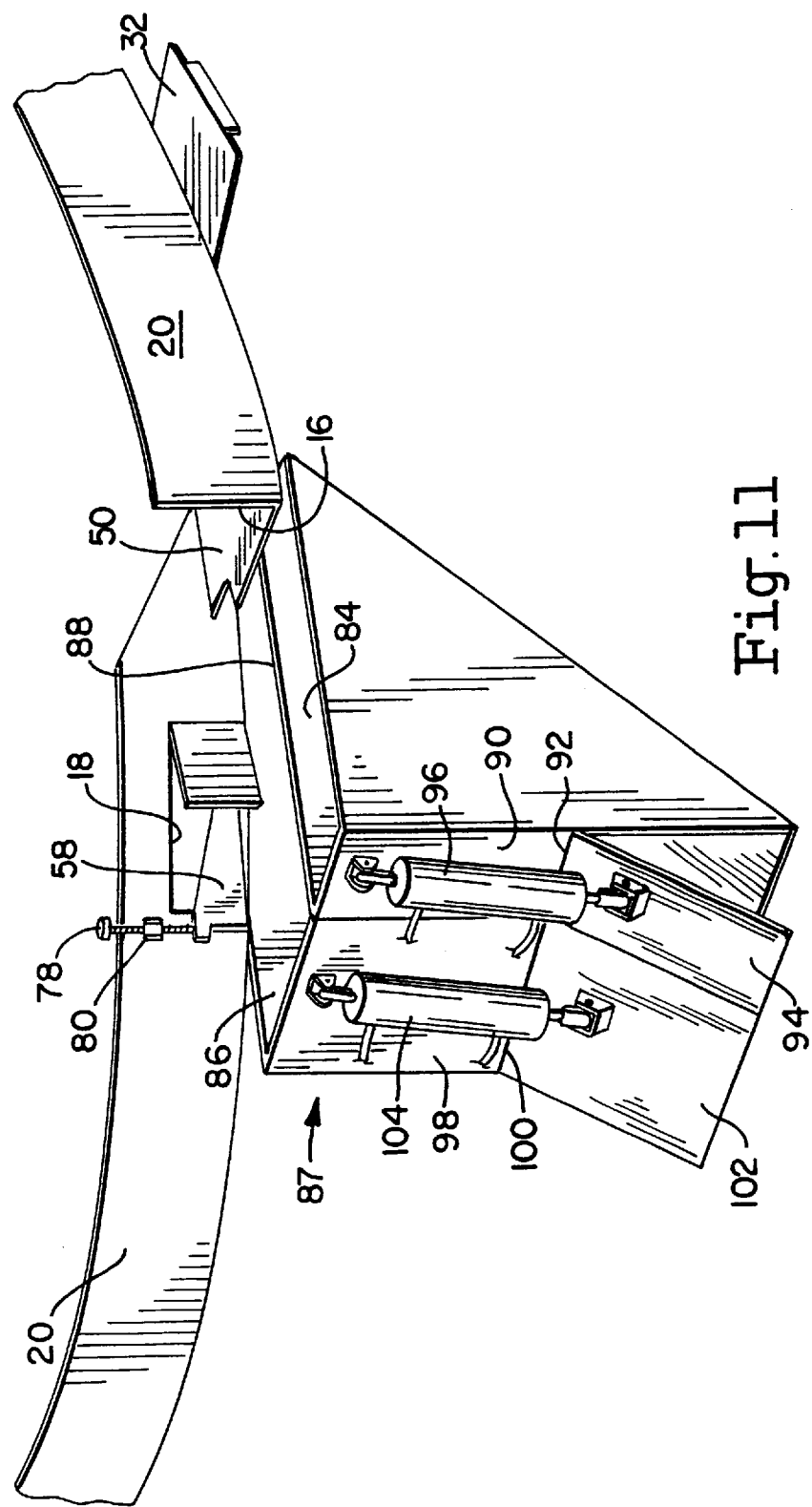
FIG. 11 is a fragmentary perspective view of the outside of the feeder bowl of FIG. 1 at the discharge ports with the deflector gate in the extended position and also showing accumulation chutes associated with each feeder bowl discharge port.

Referring now to FIG. 11, there is shown an external, fragmentary perspective view in a direction toward the discharge ports of bowl 10. Positioned below first discharge port 16 is first discharge chute 84, which as shown can be open at its top to permit articles falling from first discharge port 16 of bowl 10 to fall into chute 84. Positioned below second discharge port 18 is second discharge chute 86, which can also be open at its top, to permit articles falling from second discharge port 18 of bowl 10 to fall into chute 86. The discharge chutes can be incorporated in a unitary intermediate accumulator container 87, as shown, in which a divider panel 88 is provided, or they can be independent structures.

First discharge chute 84 includes a front wall 90 from a lower edge 92 of which a door 94 is hingedly connected. A pneumatic actuator 96 is operable to selectively open and close door 94. Similarly, second discharge chute 86 includes a front wall 98 from a lower edge 100 of which a door 102 is hingedly connected. A pneumatic actuator 104 is operable to selectively open and close door 94. Preferably, doors 94 and 102 are made from a resilient or flexible material so that any articles trapped as the door closes are not damaged, nor is the door damaged.

Figure 12:
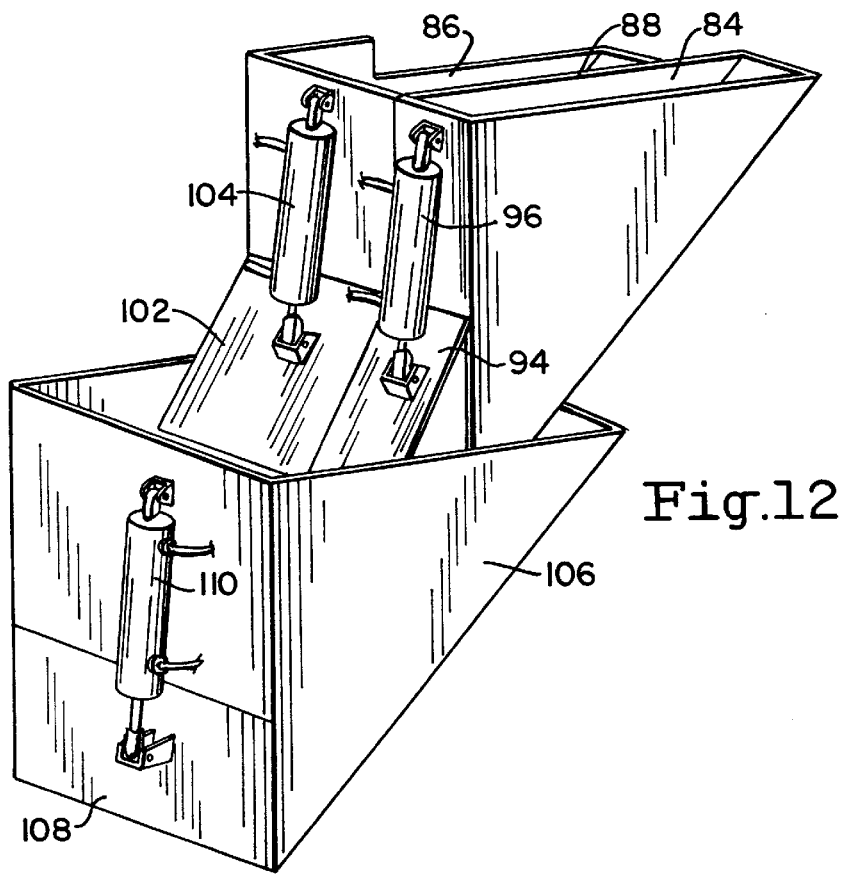
FIG. 12 is a fragmentary perspective view of the accumulation chutes and their positioning relative to a weigh hopper for weighing the articles to be accumulated and packaged.

As shown in FIG. 12, a weigh hopper 106 is positioned below each of first discharge chute 84 and second discharge chute 86 to receive articles discharged from either or both of the chutes. Hopper 106 includes an open top to freely receive articles that are discharged through the respective chutes 84, 86, and it is not mechanically connected with the chutes in any way. A door 108 is provided to permit selective discharge of articles from hopper 106, and can have a configuration and an actuating arrangement, including a pneumatic actuator 110, similar to that of doors 94 and 102 of the discharge chutes.

Figure 13:
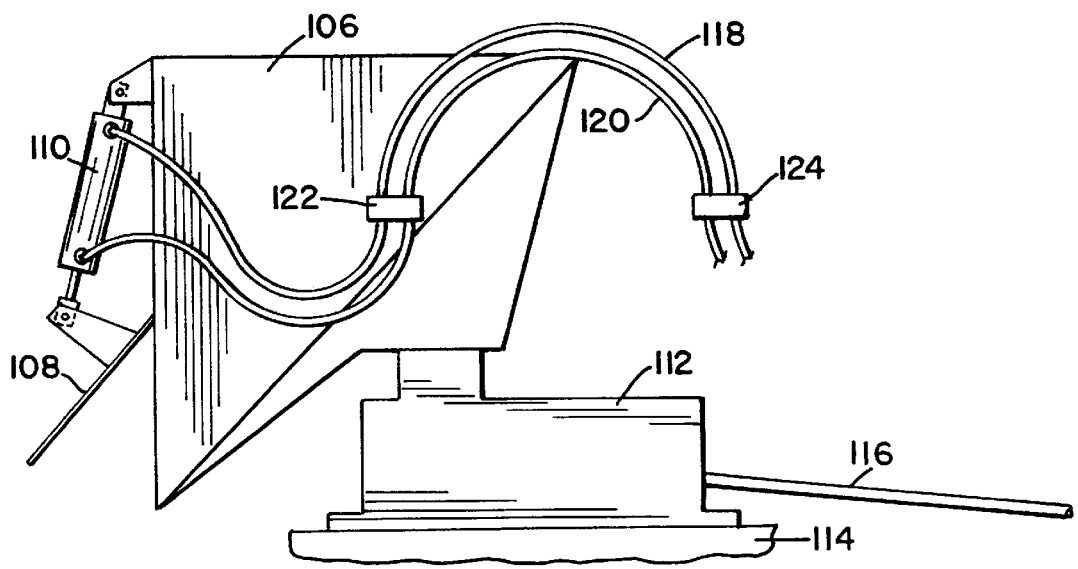
FIG. 13 is fragmentary side elevational view of the weigh hopper support and associated load cell for determining the weight of the weigh hopper and its contents.

Hopper 106 is supported on a load cell 112, that is, in turn, carried on a rigid, stationary support 114, as shown in FIG. 13. The output from load cell 112, which can be, for example, a resistance strain gauge load cell, or the like, is proportional to the weight of hopper 106 and is carried by output cable 116 to a suitable control system (not shown) that can receive operating and command signals from several sources, and can provide output control signals in accordance with a predetermined control program.

Pneumatic conduits 118, 120 that selectively supply pressurized air and provide communication with the atmosphere for the operation of cylinder 110 can be made of flexible plastic and preferably are connected and supported in the manner illustrated in FIG. 13. In that regard, pneumatic cylinder 110 is pivotally supported in a manner similar to the manner in which cylinders 96 and 104 are supported to operate doors 94 and 102 of first discharge conduit 84 and second discharge chute 86, respectively. Because the stiffness of conduits 118, 120 can impart forces to weigh hopper 106 and thereby influence the weight of hopper 106 as sensed by load cell 112, it is important to eliminate the unwanted effect of such conduit stiffness. In the present invention that effect is eliminated by supporting conduits 118 and 120 by a pair of spaced conduit supports 122, 124 that securely hold each of the conduits. Support 122 is mounted to weigh hopper 106 and support 124 is secured to a fixed, rigid portion of a frame structure (not shown) that is independent of load cell 112. Supports 122 and 124 are each positioned at the same elevation, and each support is arranged to orient the conduits so that the respective conduit axes extend vertically for those portions of the conduits that are received in the respective supports. The orientation and support of conduits 118, 120 as shown in FIG. 13, to provide a pair of parallel, substantially equally spaced upwardly extending loops of conduit between supports 122 and 124, and a pair of parallel, substantially equally spaced downwardly extending loops of conduit between the center of cylinder 110, at a point midway between the connection points with cylinder 110 of conduits 118 and 120, and support 122, results in a pair of equal and opposite conduit-induced forces acting on weigh hopper 106. Accordingly, those equal and opposite forces cancel each other to eliminate any such conduit-imposed forces and to obtain an accurate weight determination by the load cell of the weight of weigh hopper 106 and its contents.

Figure 14:
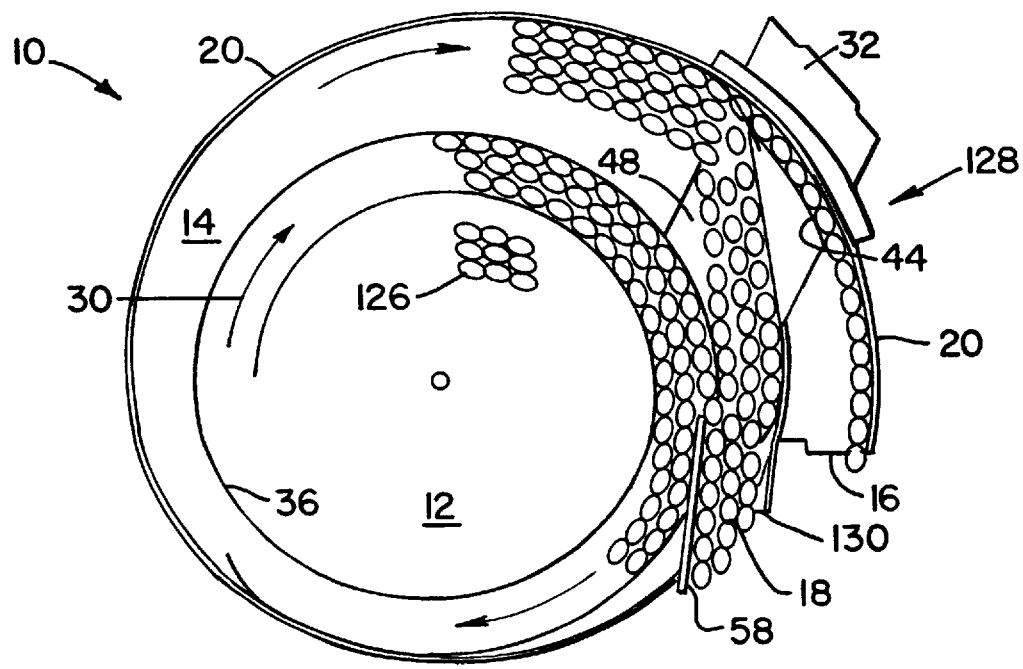
FIG. 14 is a top plan view of the feeder bowl of FIG. 1 showing the positions of articles within the bowl when the deflector gate is in its extended, article-deflecting position.
Figure 15:
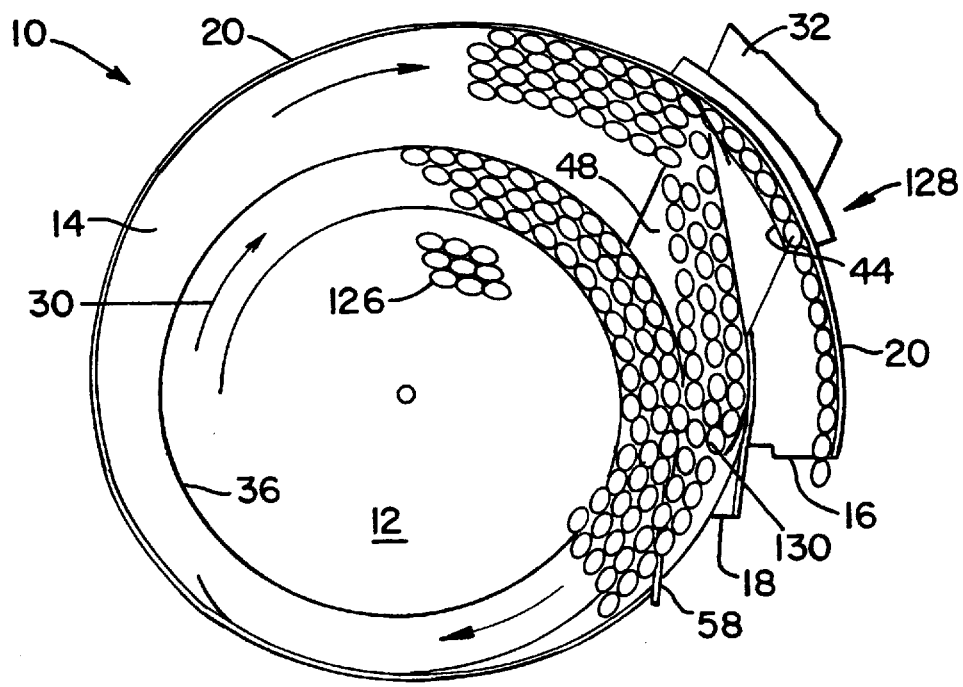
FIG. 15 is a top plan view similar to FIG. 11, showing the positions of articles within the bowl when the deflector gate is in its retracted, non-article-deflecting position.

In operation, and referring to FIGS. 14 and 15, articles to be counted and weighed are loaded from a supply hopper (not shown) into central bowl portion 12 of feeder bowl 10 to a predetermined level within the bowl. Bowl 10 is then caused to rapidly vibrate by a suitable vibrator (such as a Syntron Model VPF350 magnetic driver base manufactured by FMC Corp., Homer City, Pa.) as a result of which the articles are induced to travel along and around track 14 in a spiral path and in a clockwise direction as shown by arrow 30. As the stream of progressing and vibrating articles 126 reaches slide 32, a single file line 128 of articles travels along narrow surface 44, guided by side wall 20, toward first discharge port 16. Those articles that lie inwardly of single file line 128 fall downwardly and inwardly along chute 48 and toward second discharge port 18.

In FIG. 14 gate 58 is in the upper or extended position, as shown in FIGS. 7 and 9, and thus serves to deflect and guide the stream 130 of grouped articles to move to second discharge port 18. In FIG. 15 gate 58 is in the lower or retracted position, as shown in FIGS. 8 and 10, as a result of which the stream 130 of articles is not deflected toward discharge port 18 but, instead, falls inwardly and downwardly to track 14, to join with other articles and to once again resume progressive vibratory movement toward one or the other discharge ports. Vibratory forces are imposed on bowl 10 continuously, and gate 58 can be selectively raised and lowered while the bowl is vibrating to provide the necessary number of articles without any backup of articles in the bowl, because the feed of articles to the bowl is controlled by an article level sensor, or the like, which is not shown because such devices are known to those skilled in the art.

As the articles exit each of first discharge port 16 and second discharge port 18 they fall into respective discharge chutes 84 and 86 of intermediate container 87 (see FIGS. 11 and 12). Thereafter, a plurality of articles can be released from either or both the first and second discharge chutes to fall into weigh hopper 106 until a predetermined weight of articles is sensed by load cell 112, after which chute door 102 of second discharge chute 86 is closed. Individual articles can then be permitted to continue to fall singly from first discharge chute 84 until the desired total number of articles is accumulated in weigh hopper 106, whereupon hopper 106 containing the desired number of articles can be tilted or otherwise unloaded to deposit its contents into a bag, a carton, or another form of package (not shown).

The articles leaving first discharge chute 84 can be counted by a suitable counting device that senses individual articles and counts them. Preferred devices for performing the sensing and counting functions are illustrated and described in U.S. Pat. Nos. 5,313,508 and 5,454,016, each of which issued assigned to Batching Systems, Inc., of Owings, Md.

Various operating cycles can be performed using the disclosed apparatus to provide groups of articles by count or by weight. A suitable control system can be provided to automatically control the following functions at the appropriate times: to start, stop, and change the speed and direction of the vibratory bowl; to start and stop an article supply hopper to maintain a desired level of articles in the bowl; to raise and lower gate 58 in the bowl; to open and close chute doors 94 and 102; to store a desired weight and to receive weight signals from load cell 112; to open and close door 108 on weigh hopper 106; to communicate with a human operator through appropriate displays; to enable input parameters to be stored and accessed; to receive input signals from and to provide output signals to equipment for receiving completed batches of articles; to perform the necessary functions to deliver batches of articles based upon weight or count, at an operator's option.

Although particular embodiments of the present invention have been illustrated and described, it will be apparent to those skilled in the art that various changes and modifications can be made with departing from the spirit of the present invention. It is intended to encompass within the appended claims all such changes and modifications that fall within the scope of the present invention.

What is claimed is:

1. Apparatus for receiving a plurality of individual articles and for feeding and dispensing the articles in predetermined batches, said apparatus comprising:
   a. a feeder bowl for receiving a plurality of articles to be arranged in predetermined batches, the bowl including a spiral track along which articles within the bowl are caused to move by vibrating the bowl, the bowl including a first discharge port and a second discharge port, wherein the track includes a narrow ledge upstream of the first discharge port to pass articles individually in single file order and the track upstream of the second discharge port has a width to pass articles to the second discharge port in a stream containing a plurality of articles;
   b. an intermediate receiver positioned to receive articles discharged form the first and second discharge ports, the intermediate receiver including a first discharge chute for receiving articles discharged from the first discharge port and a second discharge chute for receiving articles discharged from the second discharge port, wherein each of the first and second discharge chutes includes a respective chute outlet door operable to control the flow of articles from the respective discharge chutes; and
   c. a weighing device positioned to receive articles discharged from the first and second discharge chutes of the intermediate receiver, the weighing device including a container and a weighing means associated with the container for sensing the weight of the container and its contents.

2. Apparatus in accordance with claim 1 wherein the feeder bowl outlet ports are positioned in substantially side-by-side relationship.

3. Apparatus in accordance with claim 1 wherein the first and second outlet ports face in the same direction.

4. Apparatus in accordance with claim 1 wherein the feeder bowl includes a first exit track that terminates at the first discharge port, and a second exit track that terminates at the second discharge port, and the first and second exit tracks each merge into the spiral track at points spaced upstream from the respective discharge ports.

5. Apparatus in accordance with claim 1 wherein the weighing device includes a container having a discharge door for discharging articles that fall into the weighing device from the intermediate receiver.

6. Apparatus in accordance with claim 5 wherein the weighing device includes a load cell positioned below the container to sense the weight of the container and its contents.

7. Apparatus in accordance with claim 5 including a pressurized-fluid operated cylinder for actuating the discharge door between closed and open positions.

8. Apparatus in accordance with claim 7 including pressurized-fluid-carrying conduits connected with the cylinder, wherein the conduits are supported by a pair of spaced conduit supports disposed to support the conduits to limit conduit-induced forces on the container.

9. Apparatus in accordance with claim 8 wherein the conduit supports are disposed in a substantially horizontal plane and the conduits define an upwardly extending loop and a downwardly extending loop between the cylinder and an outermost conduit support.

10. Apparatus in accordance with claim 1 wherein the narrow ledge is defined by an inwardly movable slide.

11. Apparatus in accordance with claim 10 wherein the bowl includes an inwardly-sloping chute positioned below the slide for directing articles that fall from the ledge into the track upstream of the second discharge port.

12. Apparatus for receiving a plurality of individual articles and for feeding and dispensing the articles in predetermined batches, said apparatus comprising:
   a. a feeder bowl for receiving a plurality of articles to be arranged in predetermined batches, the bowl including a spiral track along which articles within the bowl are caused to move by vibrating the bowl, the bowl including a first discharge port and a second discharge port, wherein the first discharge port is adapted to pass articles individually and the second discharge port is adapted to pass articles in a stream containing a plurality of articles;
   b. an intermediate receiver positioned to receive articles discharged form the first and second discharge ports, the intermediate receiver including a first discharge chute for receiving articles discharged from the first discharge port and a second discharge chute for receiving articles discharged from the second discharge port, wherein each of the first and second discharge chutes includes a respective chute outlet door operable to control the flow of articles from the respective discharge chutes; and
   c. a weighing device positioned to receive articles discharged from the first and second discharge chutes of the intermediate receiver, the weighing device including a container and a weighing means associated with the container for sensing the weight of the container and its contents; and d. a diverter gate positioned adjacent the second exit track for diverting flow of articles from the second exit track to the second discharge port.

13. Apparatus in accordance with claim 12 wherein the feeder bowl includes a slot that passes through the spiral track adjacent the second exit track for slidably receiving the diverter gate for movement from a recessed position, wherein the diverter gate is below the second exit track, to an extended position, wherein the diverter gate extends above the second exit track to divert articles carried on the second exit track.

14. Apparatus in accordance with claim 13 wherein the slot is substantially tangential to a circle having its center coincident with the center of the feeder bowl.

15. Apparatus for receiving a plurality of individual articles and for feeding and dispensing the articles in predetermined batches, said apparatus comprising:

a. a dual-flow, vibratory, article feeder bowl for receiving a plurality of articles, the bowl including a first exit track having a narrow ledge for feeding articles individually to a first discharge port and a second exit track having a width greater than the narrow ledge for feeding articles in a stream to a second discharge port;

b. a dual chamber accumulator positioned to receive articles from the feeder bowl, the accumulator including a first chamber for receiving individual articles that exit from the first discharge port, and a second chamber for receiving a plurality of articles that exit as a group from the second discharge port, each chamber including a discharge door to discharge articles from the respective chambers; and c. a weigh hopper positioned to receive articles discharged through the discharge doors of the accumulator and provide a signal indicative of the weight of articles within the hopper.

16. A method for accumulating a predetermined number of articles, said method comprising the steps of:

a. loading a feeder bowl with a plurality of the articles;

b. discharging a stream of articles from the feeder bowl through a second discharge port into a weigh hopper until a predetermined weight of articles is received in the weigh hopper;

c. determining the number of articles in the weigh hopper based upon the weight of the weigh hopper and the weight of an individual article;

c. individually discharging a sufficient number of additional articles from the feeder bowl through a first discharge port into the weigh hopper until a desired total number of articles is determined to be within the weigh hopper; and d. discharging the articles from the weigh hopper into a container positioned to receive articles discharged from the weigh hopper.

17. A method in accordance with claim 16 including the steps of holding articles discharged from the feeder bowl in an accumulator until the weigh hopper is emptied, and releasing the articles from the accumulator into the empty weigh hopper.

18. A method in accordance with claim 17 including the step of stopping the discharge of articles from the accumulator when a predetermined number of articles has been received in the weigh hopper.

* * * * *